US011250660B2

(12) United States Patent
Derome et al.

(10) Patent No.: US 11,250,660 B2
(45) Date of Patent: *Feb. 15, 2022

(54) GRAPHICAL USER INTERFACE FOR A GAMING SYSTEM

(71) Applicant: Supercell Oy, Helsinki (FI)

(72) Inventors: John Nicholas Derome, Helsinki (FI); Lassi Leppinen, Espoo (FI)

(73) Assignee: Supercell Oy, Helsinki (FI)

( * ) Notice: Subject to any disclaimer, the term of this patent is extended or adjusted under 35 U.S.C. 154(b) by 0 days.

This patent is subject to a terminal disclaimer.

(21) Appl. No.: 16/869,870

(22) Filed: May 8, 2020

(65) Prior Publication Data

US 2020/0388103 A1  Dec. 10, 2020

Related U.S. Application Data

(63) Continuation of application No. 16/207,290, filed on Dec. 3, 2018, now Pat. No. 10,685,529, which is a
(Continued)

(51) Int. Cl.
*G07F 17/32* (2006.01)
*A63F 13/218* (2014.01)
(Continued)

(52) U.S. Cl.
CPC ........... *G07F 17/3209* (2013.01); *A63F 9/24* (2013.01); *A63F 13/218* (2014.09);
(Continued)

(58) Field of Classification Search
None
See application file for complete search history.

(56) References Cited

U.S. PATENT DOCUMENTS

2005/0164794 A1* 7/2005 Tahara ............... A63F 13/2145
463/43
2006/0097991 A1* 5/2006 Hotelling ............. G06F 3/0446
345/173
(Continued)

FOREIGN PATENT DOCUMENTS

WO    WO-2016199860 A1 * 12/2016 ......... A63F 13/2145

OTHER PUBLICATIONS

Japan Patent Office, Office Action, Application No. 2019142625, dated Jun. 15, 2020, 3 Pages.
(Continued)

*Primary Examiner* — Tramar Harper
(74) *Attorney, Agent, or Firm* — Ziegler IP Law Group, LLC

(57) ABSTRACT

A graphical user interface for a gaming console is configured to render a first graphical element in a first region that includes multiple user selectable resource objects, detect a first touching operation at a first location in the first region to select and highlight a resource, detect a first touching operation and a second touching operation in the second region, render an instance of the resource at a first and second location in the second region, determine if a time period of the first and second touching operation exceeds a
(Continued)

predetermined time period, and if so, render multiple instances of the resource at the first and second location in the second region, wherein a number of rendered the multiple instances of the resource is determined by a duration that the time period of the second touching exceeds the predetermined time period.

11 Claims, 6 Drawing Sheets

Related U.S. Application Data continuation of application No. 15/822,709, filed on Nov. 27, 2017, now Pat. No. 10,152,844, which is a continuation of application No. 15/093,829, filed on Apr. 8, 2016, now Pat. No. 9,830,765, which is a continuation of application No. 14/330,197, filed on Jul. 14, 2014, now Pat. No. 9,308,456, which is a continuation of application No. 13/479,637, filed on May 24, 2012, now Pat. No. 8,814,674.

(51) Int. Cl.
*A63F 9/24* (2006.01)
*A63F 13/2145* (2014.01)
*A63F 13/533* (2014.01)

(52) U.S. Cl.
CPC ........ *A63F 13/2145* (2014.09); *A63F 13/533* (2014.09); *G07F 17/3211* (2013.01); *A63F 2300/1075* (2013.01); *A63F 2300/308* (2013.01); *A63F 2300/8029* (2013.01)

(56) References Cited

U.S. PATENT DOCUMENTS

| | | | | |
|---|---|---|---|---|
| 2006/0178213 | A1* | 8/2006 | Ohta | A63F 13/10 463/37 |
| 2006/0252531 | A1* | 11/2006 | Kando | A63F 13/56 463/30 |
| 2006/0258453 | A1* | 11/2006 | Kando | A63F 13/52 463/36 |
| 2010/0080491 | A1* | 4/2010 | Ohnishi | G06F 3/0486 382/298 |
| 2012/0196676 | A1* | 8/2012 | Login | A63F 13/426 463/31 |
| 2014/0248948 | A1* | 9/2014 | Ho | A63F 13/426 463/31 |

OTHER PUBLICATIONS

Nishimoto et al. "Fleet Commander Game for Tactile Multi-touch Display" Evltube, Youtube, Aug. 25, 2010, 3 Pages.

Nishimoto, Arthur, "Fleet Commander" Arthur Nishimoto's Site, Time Frame: Fall 2009-Present, 5 Pages.

\* cited by examiner

GRAPHICAL USER INTERFACE FOR A GAMING SYSTEM

BACKGROUND

The present invention generally relates to user interfaces, and, more specifically, to graphical user interfaces for gaming systems.

Computing devices include tablet computers such as iPads, and smart phones, including Apple's iPhone®, Google's Android® phone, and Symbian® phones. These computing devices have extremely user-friendly interfaces, for enabling easy and quick interaction to users thereof. Most of these devices incorporate touch-sensitive screens that obtain user's inputs and facilitate smooth user interaction. Gaming software is employed in many of these devices for leisure purpose. An important aspect of a gaming system is the ease with which a user can enter desired inputs and interact with the user interface of the device on which he/she plays a game. For devices that lack a touch-screen facility incorporated therein, the only possible ways of interaction of the user while playing a game on such devices, is by clicking an associated mouse, using associated keyboard functions/keys to operate, or using associated joysticks. The experience with the 'point and click' or 'joystick' incorporated in many lower grade electronic devices is incompatible and often time consuming, while playing a game. Specifically, there are specific games where a user/player needs to use clicking, pointing, tapping and dragging operations many times, and often at different device display locations, which is hard to operate through a mouse or a joystick. In a typical gaming environment, where a user needs to perform similar operations by clicking or touching on multiple points on the interface, this becomes cumbersome. Even the touch-sensitive screens, provided in many conventional electronic devices, are capable of sensing the touching operation at one point at a time. Multi-touch screens are still not popular, and they can be of great benefit in gaming environment. Some of the conventional gaming console applications can be controlled through multi-touch sensitive operations, however, in strategic gaming environments, for performing certain desired operations, they still have some drawbacks.

Therefore, considering the aforementioned problems, there exists a need for a better and highly congenial graphical user interface for a gaming system, while playing a game on a computing device.

SUMMARY

The present disclosure provides an extremely compatible graphical user interface that facilitates an easy user interaction while the user plays a game on a computing device. Specifically, the disclosure provides a system and a method that facilitate an improved user experience, by sensing and obtaining user inputs through touching or swiping operations performed at multiple points on the graphical user interface corresponding to a gaming console.

In an aspect, the present disclosure provides an electronic device that includes a touch sensitive display screen and a computing hardware that executes a software product corresponding to a gaming system. The display screen simultaneously senses touching operations performed at multiple locations on the screen. When the software product is executed on the computing hardware, it generates and renders a graphical user interface on the display screen of the electronic device. The graphical user interface facilitates easy user interaction, and when rendered on the display screen, it presents multiple graphical objects and a number of user selectable options corresponding to the graphical object. Each user selectable option represents multiple resources for performing an operation on one or more of the graphical objects. A user selects one or more of these options, and the software product renders the resources corresponding to that option at different locations on the interface. The resources corresponding to the selected option are rendered when the user touches or swipes through the multiple points of the interface. Further, the nature of rendering and deploying the different resources on the interface depends on parameters like the speed with which the user performs the touching or swiping operation, or the pressure applied by the user on the interface while performing either the touching or the swiping operation.

In another aspect, the present disclosure provides a method of facilitating easy user interactions with a graphical user interface. A software product is executed on the computing hardware of the electronic device, and this results in generating and rendering of the interface on the display screen of the device. One or more graphical objects and a set of user selectable options corresponding to the graphical objects are rendered on the interface. Each user selectable option corresponds to one or more resources to be deployed on the interface. The method includes selecting one or more of these selectable options and performing a touching operation or a swiping operation over multiple points on the display screen of the device. Eventually, the resources corresponding to the selected option are deployed at multiple locations on the interface simultaneously. These locations correspond to the different points at which the touching or the swiping operation is performed.

The system and method of the present disclosure facilitates performing similar operation on a gaming console through multiple regions of the console at the same time, and avoids the cumbersome operations of touching or swiping through different points, each one at a time.

Additional aspects, advantages, features and objects of the present disclosure would be made apparent from the drawings and the detailed description of the illustrative embodiments construed in conjunction with the appended claims that follow.

DETAILED DESCRIPTION OF ILLUSTRATIVE EMBODIMENTS

The following detailed description discloses aspects of the claimed invention and ways in which it can be implemented. However, the description is not intended to define or limit the invention, such definition or limitation being solely contained in the claims appended thereto. Although the best mode of carrying out the invention has been disclosed comprehensively, those in the art would recognize that other embodiments for carrying out or practicing the invention are also possible.

The present disclosure pertains to a graphical user interface for a gaming system, for facilitating easy and quick interaction of a user while playing a game, and for avoiding contemporary problems experienced while performing touching or swiping operations on the touch sensitive screens of electronic devices on which the games are being played.

Gaming systems are incorporated for leisure in many electronic computing devices, including computers, iPads, mobile phones, tablet computers and smart phones. Many such conventional electronic devices incorporate touch-sensitive screens for obtaining user inputs and for making congenial user experience with the interface. For playing games on electronic devices without a touch-sensitive screen, including many desktop and laptop computers, the user generally interacts with and provides inputs to gaming system's interface through coupled input devices, such as mice, certain keys on the keypads, and joysticks. Using multiple clicking operations through a mouse is time consuming and unfavorable, for example, in cases where a same operation needs to be performed at multiple points on the gaming interface. Even with the devices have touch-sensitive displays, when similar operations corresponding to the game being played need to be performed simultaneously through multiple regions of the interface, this becomes difficult to achieve as the conventional touch-sensitive screens are capable of sensing touching operations one at a time, at a specific point. Even though multi-touch sensitive screens are currently available, and are incorporated in electronic devices, operations corresponding to certain games, when played, require simultaneous sensing and detecting of touching or swiping operations performed through multiple regions of the screen.

The present disclosure provides an enhanced graphical user interface for a gaming system, which improves a user's experience while playing a game on an electronic device. The system and method facilitate performing of touching and swiping operations through a multi-touch sensitive screen of the electronic device, and allows the user to perform similar operations pertaining to the game, simultaneously, through different regions of the interface.

Figure 1:
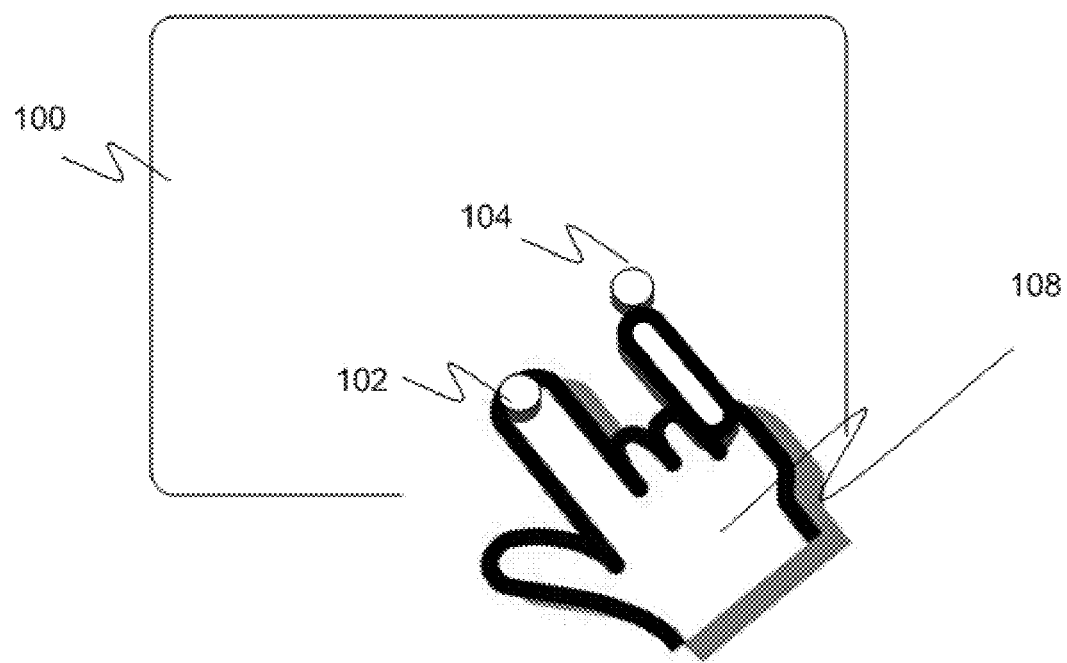
FIG. 1 is an illustration of a manner of operating over a graphical user interface of an electronic device, in accordance with the present disclosure.

In FIG. 1, there is shown a graphical user interface corresponding to a game being played on an electronic device, showing how a user playing a strategic game performs touching or swiping operations through multiple points of the interface, simultaneously, for executing similar operations through multiple locations on the interface. As shown, a graphical user interface 100, corresponding to the game being played, is rendered on a display screen on the electronic device. Specifically, the interface 100 is rendered and presented on the display screen, when a software product corresponding to the game, is executed on computing hardware of the electronic device. The display screen is a multi-touch sensitive screen, capable of sensing touching or swiping operations performed at multiple points on the screen simultaneously. A user 108 uses two of his/her fingers and performs touching operations at two different locations 102 and 104, on the interface 100. The interface 100 senses this operation, and the software product corresponding to the game, executes actions pertaining to the performed touching operation on different graphical objects of the interface 100. This is explained in more details hereinafter with respect to an example of a specific gaming environment, in conjunction with the drawings that follow.

Figure 2:
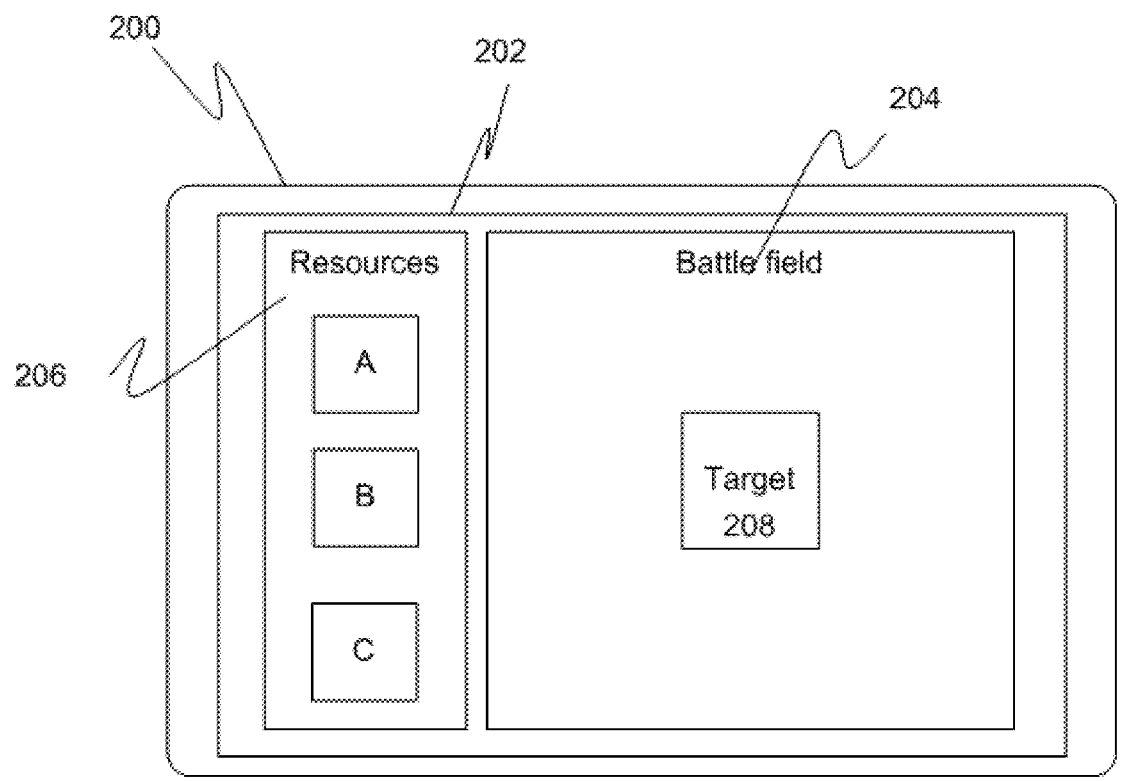
FIG. 2 to FIG. 4 are illustrations of a graphical user interface corresponding to a gaming system, rendered on a display screen of an electronic device, as the method and system of the present disclosure is used to control the gaming environment.

In FIG. 2, there is shows a snapshot of the display screen of an electronic device, when a user plays a game on the device, and uses the method of the present disclosure for controlling the gaming interface. As shown, an electronic device 200 has a display screen 202, where different resources for performing actions corresponding to the game, are being rendered on a graphical element 206 of the display screen 202. For the purpose of explaining the disclosure, the depicted gaming environment corresponds to a war-based game, and the gaming environment rendered on the display screen 202 corresponds to a battlefield 204. The device 200 can be any suitable electronic device that incorporates a multi-touch sensitive screen, including an iPad, a smartphone, for example, Apple's iPhone®, an Android phone®, or a Symbian phone®, a tablet computer, a desktop computer or a laptop computer, and so forth. The battlefield 204 has different graphical objects, for example, a target 208, which can represent a castle, or a camp. An objective of the game may be to win the castle, by attacking it through different resources A, B and C, and so forth, shown within the graphical element 206. The resources A, B and C within the element 206 can represent weapons, including guns, cannons, arrows, bows, and so forth, or represent different troops, armed soldiers, walking soldiers or horse riding soldiers, and so forth. Though only three such resources have been shown, there can be multiple other resources for playing the game. In the strategic game, the user selects one or more of these resources, and deploys the selected resources at multiple locations within the battlefield 204. The selected resources are then used to perform operations for conquering the target 208. For example, the deployed resources can be operated to attack the target 208 through the different weapons they possess. The user can use multiple touching operations simultaneously, at different points on the display 202, to deploy the resources A, B, C, and so forth at multiple locations within the battlefield 204. Moreover, the user can also perform the swiping operation, to deploy a specific resource all through a set of points along a specific path, by swiping fingers across that path. The movement of the different deployed resource, either away from, or towards the target 208, can be controlled by pointing towards a specific deployed resource, and swiping the finger in the desired direction. When the user touches the display screen 202 to deploy a selected resource, the screen 202 detects the pressure applied by the user at different points. The number of resources deployed at different locations optionally depends on the amount of pressure applied. Specifically, a higher pressure applied at a specific point results in deploying increased numbers of resources at that point, and vice versa. Additionally when playing resources can be released at constant rate over time or at accelerated/deaccelerated rate depending on game settings. Moreover, the rapidity of deploying the resources at different locations on the battlefield 204 depends upon the speed with which the user performs the touching or the swiping operation through different points. For example, if the user wishes to deploy a selected resource along different points in a specific path, and performs a swiping operation through the path, the resources are deployed as quickly as the swiping operation through the path is performed. A rapid swiping operation results in a quicker deployment of resources, compared to a slow swiping operation.

Figure 3:
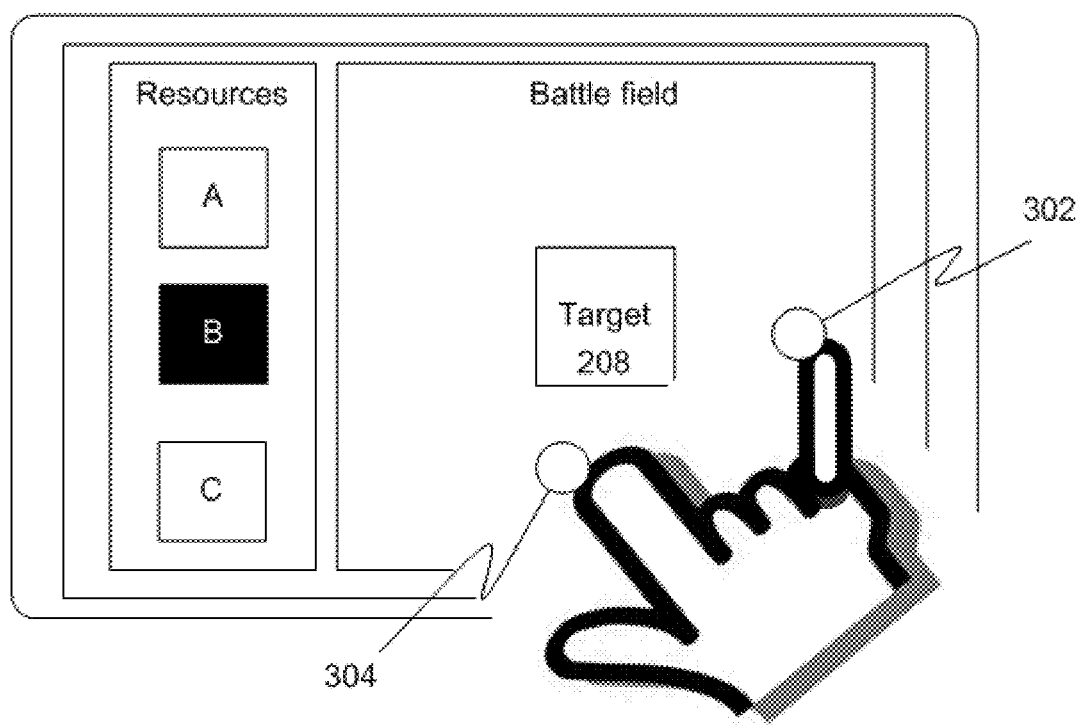

Continuing further, in FIG. 3, there is shown the display screen of the device, when the user has selected one of the selectable options A, B and C, for deploying resources within the battlefield of the war-based game. Shown as an example, the user has selected the option B corresponding to a specific category or type of resources to be deployed in the battlefield, to operate on the target 208 thereafter. As aforementioned, the selected resources may be troops, armed soldiers possessing specific kinds of weapons, horse riding soldiers, and so forth. Further, though only one option has been shown being selected, the user can also select multiple options to deploy different kinds of resources in the battlefield. Eventually, after selecting the option B, the user uses two of his/her fingers to control the interface and deploy the troops at two desired points 302 and 304, as shown. Specifically, the user performs a touching operation at the points 302 and 304 preferably simultaneously to enable deployment of the troops at the same time. Alternatively touching operations can be performed in temporal sequence, namely one-by-one. Alternatively, a swiping operation may also be performed by initiating from either of the selected points 302 and 304, through a specific desired path, to deploy the resources all through the desired path. In an embodiment, the resources are deployed at the selected points, at a specific pre-determined time after the touching operation is performed. For example, in one embodiment, the resources may be deployed at a specific point only if the user keeps his finger in touch with the point for a pre-determined time, which may be about 0.5 to 1 seconds. This feature is adjustable, and the minimum time for which the user needs to keep his fingers in contact with the screen, for deploying the resources, can be customized based on the user's desire, before playing the game. Further, this avoids the cases where the resources may be deployed unintentionally or undesirably.

A specific deployed resource is released for action, for example, to attack the target 208, based on detection of certain conditions. This may include, for example, the user still keeping his/her finger at a desired point, for about 1 to 2 seconds after the resource has been already deployed at that point. In another case, an execution option may be separately rendered on the display screen, and the user needs to provide an execution command through the option, after the resources are deployed. Further, the multi-touch operations performed through the different fingers act independently, and the display screen is configured to sense and interpret the swiping or touching operations performed through these fingers independently. Specifically, as an example, when one finger is touched or swiped through specific points on the screen, one set of resources may be deployed over one set of locations corresponding to those points, and subsequently, when another finger is touched or swiped through a different set of points, a second set of resources may be subsequently deployed over those points too. The two sets of resources may be same or different, depending on the game settings, which are user adjustable, and can be customized before playing the game. Further, as aforementioned, the display screen is also capable of sensing touching or swiping operations performed at different points simultaneously, and deploy the resources at different points together. In an embodiment, the number of resources deployed at different points, may be one each corresponding to detecting of a touching operation performed at that point. Alternatively, a constant number of resources per unit time may be deployed at a specific point, or over a set of points, as long as a touching or a swiping operation is performed over those points. In another embodiment, as aforementioned, the number of resources deployed is a function of the pressure applied by the user while performing the touching or swiping operation. Specifically, a higher pressure applied at a specific point optionally results in deploying more number of resources at that point, and vice versa.

Figure 4:
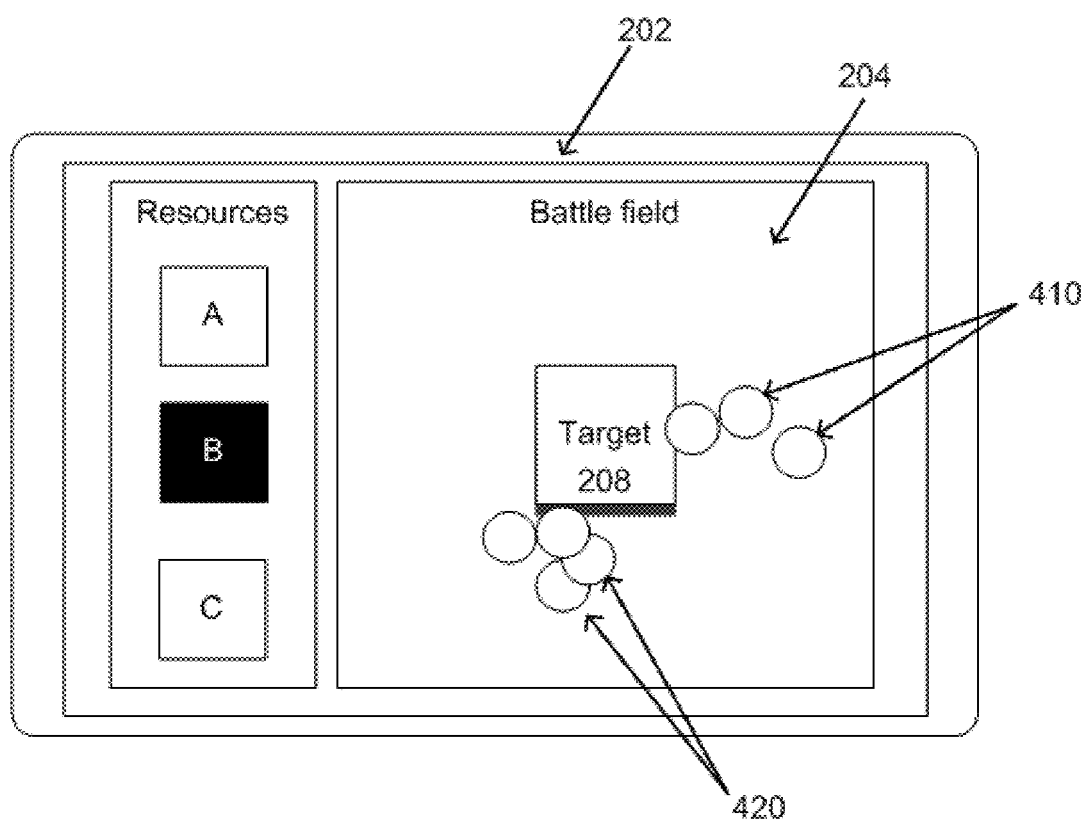

Continuing further, in FIG. 4, there is illustrated the display screen of the electronic device, where the resources corresponding to the selected option B, are shown deployed at multiple locations on the display screen. As shown, a set of resources 410 are deployed at one set of locations on the screen 202, and these correspond to multiple touching operations performed earlier around a point 302 (shown in FIG. 3). To deploy the resources 410, the user optionally performs a swiping operation through a path covering these points. Further, another set of resources 420 are shown deployed on the other side of the target 208. These resources are rendered when the touching operations initiating with a point 304 (see FIG. 3) is performed by the user, through another finger. Similarly, a touching or swiping operation is optionally performed at many other points on the display screen 202, to deploy the resources at other desirable points.

Figure 5:
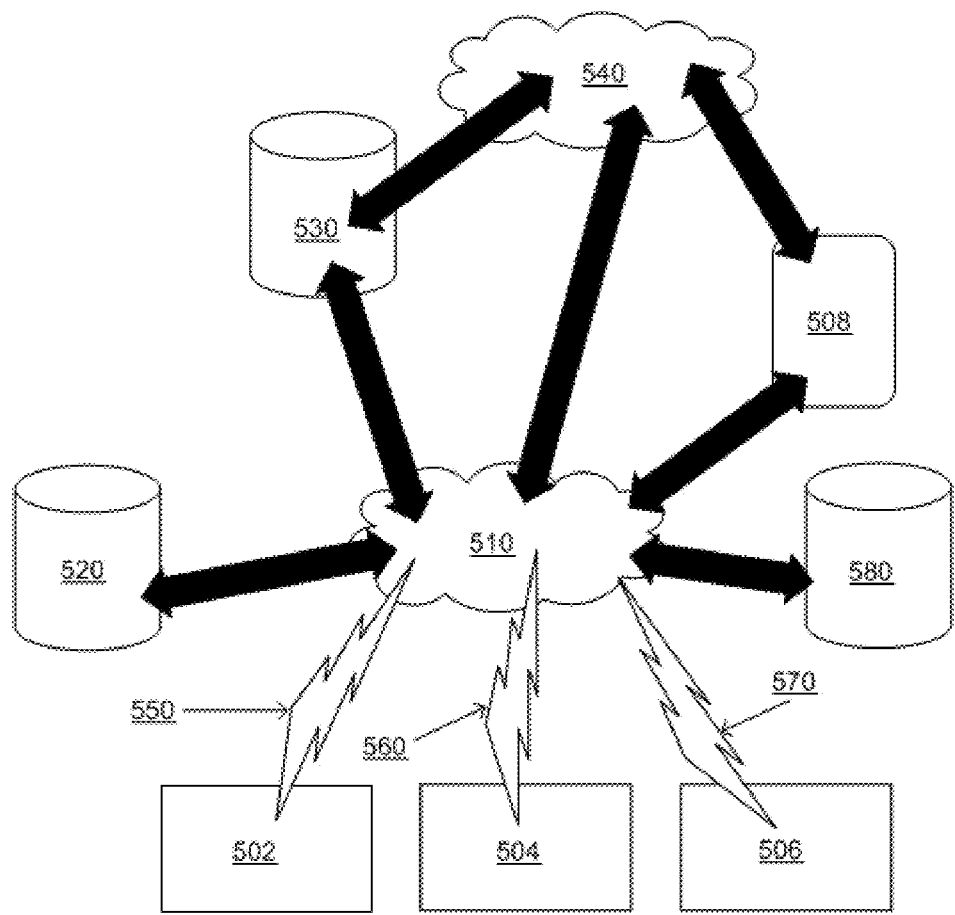
FIG. 5 is an illustration of an exemplary environment for implementing the method and system in accordance with the present disclosure.

In FIG. 5, there is shown an illustration of an exemplary environment for implementing the method and system in accordance with the present disclosure. A plurality of electronic devices 502, 504, 506 and 508 are shown, through which a user can connect to one of different gaming servers 510 and 540, through one of a multiple networks represented by 550, 560 and 570. The electronic devices 502, 504, 506 or 508, can be any suitable electronic devices having a computing hardware capable of supporting and executing a software product corresponding to a gaming system. Typical examples of the illustrated electronic devices may include a desktop computer, a laptop computer, a tablet computer, a smart phone including the popularly known iPhones®, Android phone® etc., an iPad, and so forth. Furthermore, all these electronic devices have one or more multi-touch sensitive screens for sensing and obtaining a user's input through touching or swiping operations performed at multiple points of the one or more display screens. Moreover, the different electronic devices 502, 504, 506 and 508, are commonly connected to each other through either of the servers 510 and 540, through suitable communication networks. The networks 550, 560 and 570, and so forth, may be Wireless networks, such as a Wireless Local area network (WLAN), Local area networks (LAN), cellular networks, for example, 2G network, 3G network, and so forth. Further, any of the electronic devices 502, 504, 506 and 508 may also use its own Bluetooth network and may be capable of connecting to a Bluetooth server, to synchronize with the other electronic devices. The shown exemplary environment supports multiplayer gaming too, by facilitating multiple users to be online through different devices, connecting through a suitable network, and synchronizing with each other. Further, multiple databases, as shown by modules 520, 530, and so forth, are coupled to different servers, and information related to the gaming environment is continuously stored in these databases, when the different users are online for multiplayer gaming.

For facilitating single player gaming, a user logs on through any of the electronic devices 502, 504, 506 or 508, and connects to one of the gaming servers 510 or 540, through a suitable network, for example via the Internet and/or a wireless communication network. As the user logs on, and executes the gaming software on the computing hardware of the specific device that he/she utilizes, for example, the device 502, a graphical user interface corresponding to the game is generated, and is rendered on the display screen of the device 502. The graphical user interface presents different graphical objects pertaining to the game, on the display screen of the device 502. The graphical objects may be represented by different blocks/segments of the graphical user interface, on which different operations corresponding to the game being played, can be performed. For example, in a case where the game is a war-based game, such blocks/segments may represent one or more targets that need to be conquered, such as the target 208 shown earlier in FIG. 2. Further, one or more graphical elements, representing a set of user selectable options for performing actions on the graphical objects, are also rendered on the interface of the device 502. Such elements have been explained in detail earlier, in conjunction with the previous drawings of the disclosure, which pertain to a war-based game. Moreover, a point object (cursor) movable over the different graphical objects appears on the graphical user interface, for controlling the gaming operations. The pointer object is controllable by performing touching, swiping or tapping operations on the display screen of the device 502. Further, other input devices, including a mouse, a joystick or a set of keyboard buttons, may be coupled to the device 502 (though not shown), for facilitating provision of user inputs. The touching operation on the display screen can be performed through use of a suitable touch-sensitive object, including fingers, a pen, a pencil, a pointing organ, and so forth.

Another database 580, coupled to the gaming server 510, serves as a back end database for the gaming server 510. As the user of the device 502 starts playing the game, typical actions and gestures performed by the user, are recorded in the back end server 580. Specifically, such actions are interpreted through the gaming server 510, and are sent as messages to the back end server 580, which eventually maintains a log of, and a backup for the played game. Such messages can be in the form of data packages sent over an Internet connection through which the device 502 is connected to the server 510, or sent over any other wireless or wired network connecting the device 502 to the server 510, as aforementioned. Typical elements of such messages for maintaining a backup for the game may include a header, a payload and a checksum. The checksum can be a function of the payload, or it may be a unique user identifier, such as a username or similar. An advantage arising from including the checksum in the back end maintaining messages, is a possibility of avoiding potential frauds while playing the game. Those in the art will understand that an appropriate checksum function or a checksum algorithm may be applied to the collected digital data, while the game is being played, to obtain the checksum. Further, the checksum corresponding to a specific data can be recomputed at any point of time, and compared to the stored checksum, to avoid possible frauds. The back end messages received by the server 510 are also sent to the other databases 520 and 530 of the server 510. In these databases 520, 530, these back end messages are used to maintain a continuous logic that represents the status of the game, for example, the exact score of the player updated with time, and a stage of the game that the player has already reached. With a continuous receipt of the back end messages by the databases 520 and 530, a regular updating of the game status is undertaken within the these server databases 520 and 530, eventually, with time. This ensures facilitating the resumption of the game to its last status, in cases where the device 510 unexpectedly shuts down, the device 510 is unexpectedly hindered in its communication or the user changes the gaming terminal, or he/she intentionally quits playing for a certain period, and logs in at some other time, such a possibility of resumption assists to enhance user satisfaction with the graphical user interface. Release/use of resources (such as troops) typically reduces game credits i.e. available funds for playing the game. Game credits can be credits which are earned during the game course or game credits can be purchased with credit card or other payments method. Each player can have their game credit stored in for example back end database 580. Back end database 580 can have billing interface to credit card company, bank or other payment/credit methods and systems such as Paypal® or to mobile payment done with premium rated messages (short message service).

Though only two servers 510 and 540 have been shown, there can be multiple gaming servers coordinating with, and connected to each other, for implementing the gaming environment in accordance with the present disclosure. Moreover, the environment as shown in FIG. 5 is capable of implementing a thin client game, namely written in a computer program that is partially independent in its computational roles, wherein a part of the gaming logic may be stored in any of the servers 510 and 540, and a part of it may be stored in the gaming terminal. The depicted environment also supports a thick client game, namely written in a solely independent computer, wherein the entire gaming logic may be stored in the gaming terminal. Furthermore, the game is optionally completely web-based too, wherein most of the gaming logic may be stored in any of the servers 510 or 540. The gaming software corresponding to the game being played, can be optionally written in any programming language.

Although, the gaming system implementable through the illustrated gaming environment, has been described for the case when a single user logs on to any of the electronic devices 502, 504, 506 or 508, the same gaming environment is capable of supporting multiplayer gaming, wherein different users may log on through different electronic devices, and synchronize with each other by connecting concurrently through any of the common gaming servers 510 and 540, through suitable networks as aforementioned, and share a common graphical user interface representing the ongoing game. In such embodiments, the graphical user interface rendered on the display screens of the different electronic devices, is regularly updated, concurrently, through the logic data stored in the databases 520 and 530 of the gaming servers, at the back end.

Figure 6:
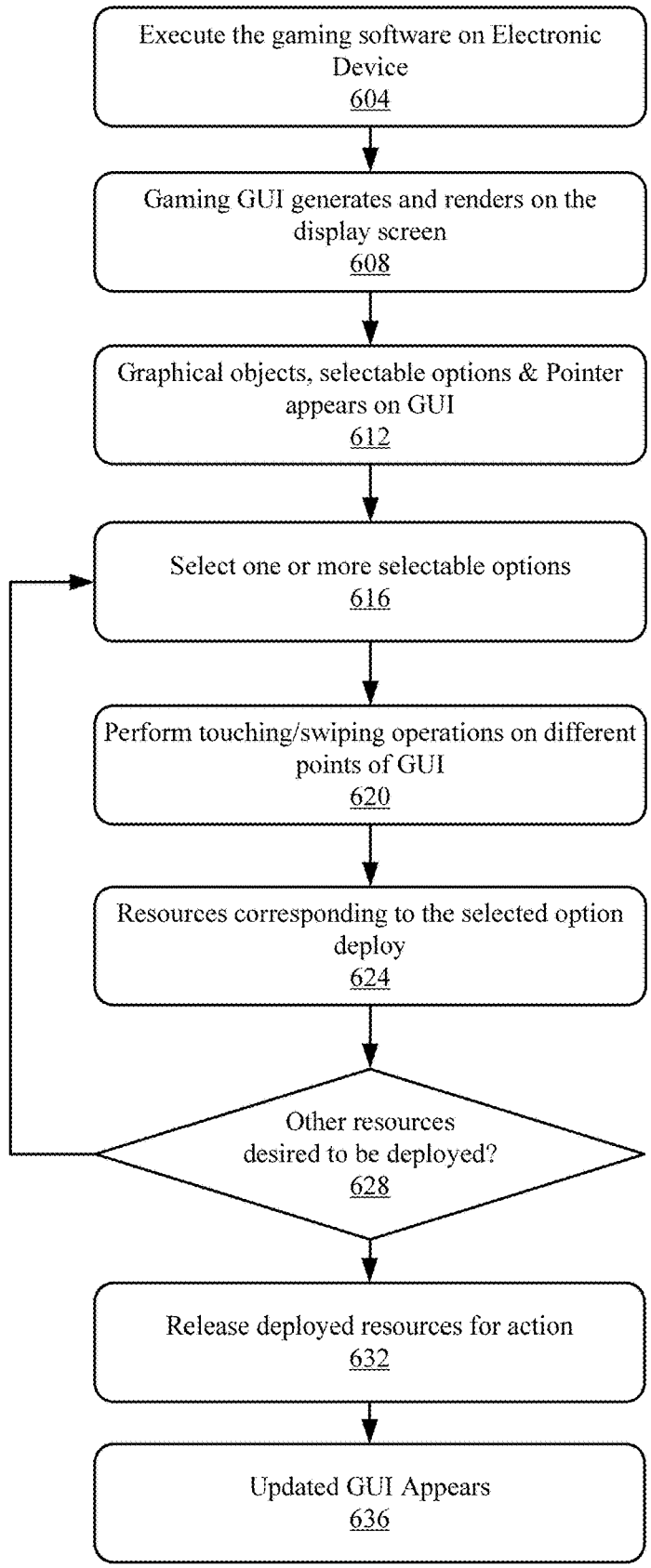
FIG. 6 is an illustration of an exemplary method of facilitating improved interaction of a user with a graphical user interface, in accordance with the present disclosure.

In FIG. 6, there is shown a method of facilitating user interactions with a graphical user interface, while playing a game. The method is explained in conjunction with a typical example of a war-based game, described earlier through the previous figures of the disclosure. However, the method can be generalized and implemented on other gaming environments also, and is not intended to limiting the scope of the present disclosure. At a step 604, the method includes a step of executing a software product on computing hardware of an electronic device. The electronic device can be any appropriate device incorporating a multi-touch sensitive screen, examples of which have been set forth earlier. The software product corresponds to a gaming system, for facilitating playing of a game on the electronic device. At a step 608, as the software product is executed, the method includes generating and rendering on a graphical user interface a representation of the gaming environment on the display screen of the electronic device. At a step 612, the method includes presenting via the graphical user interface different graphical objects, a set of user selectable options for controlling the gaming environment, and a pointer for performing touching or swiping operations through different points on the interface. For example, as aforementioned, in a war-based game, the graphical objects may correspond to a castle to be conquered, a camp to be destroyed, and so forth, and the gaming environment may represent a battlefield. The user selectable options may correspond to different resources that can be deployed over different portions of the interface, to perform operations on the graphical objects, for scoring points. Specifically, the resources may be different kinds of troops, horse riding soldiers, armed soldiers possessing versatility of weapons, including guns, bombs, cannons, bows, arrows, and so forth. At a step 616, the method includes the user selecting one or more selectable options corresponding to the different kinds of resources that he/she wants to deploy within the gaming environment. Proceeding further, after selecting and enabling one of the selectable options, at a step 620, the method includes deploying the corresponding resources, the user performs touching or swiping operations on multiple points of the interface, depending on the locations where he wishes to deploy them. At step a 624, the resources are deployed and appear on the gaming interface. In an embodiment, the nature of deployment of the different resources may depend on different parameters. For example, the number of resources deployed at a specific point, depends on the pressure applied by the user on the display screen, while performing the touching operation at that point. Moreover, if the user wishes to deploy resources along multiple points constituting a specific path, and performs a swiping operation along that path, the rapidity with which the resources are deployed depends on the speed with which the user performs the swiping operation along the path. In another embodiment, a constant number of resources per unit time can be deployed at each point where a touching operation is being performed. The nature of deployment of resources is user adjustable, and can be customized, based on the user's priority, before playing the game.

At a step 628, the method includes checking whether or not other resources are desired to be deployed, before executing actions through the resources. If yes, the method includes returning to the step 616, selecting the selectable options corresponding to the resource, and performing the touching or swiping operations through the desired points again. Else, going further, at a step 632, the method includes releasing the deployed resources for action, within the gaming environment. For example, in a war-based game, the deployed troops/armed soldiers are released for operating on a specific target, to attack it from different points where they are deployed. In an embodiment, the releasing of the deployed resources is automated, and occurs when the user keeps his/her fingers on a specific resource for a pre-determined time after deploying it. For example, this time may be about 1 to 2 seconds of touching operation after the resource is already deployed. The display screen is configured to sense this pre-determined time, and the software product executes action pertaining to the deployed resource, when this occurs. In another embodiment, releasing the different resources may require a manual user input. Specifically, for example, a triggering option (like a "go" or "fire" option) may be rendered after deploying the resources, and the resources may not be released until the user manually initiates the option. At a step 636, after the actions have been performed by the deployed resources, the graphical user interface is updated and a reformed interface representing the latest status of the gaming environment, renders on the display screen.

The method and system of the present disclosure, for improving interaction of a user with a graphical user interface corresponding to a game, provides substantial benefits as the user performs different operations in a gaming environment. Similar operations, when desired to be performed by a user, through different locations on the gaming interface, can be easily executed by touching or swiping through multiple points of the display screen simultaneously. Hence, the user's experience with the gaming interface is much more comfortable.

Though the present disclosure has been described comprehensively, through an exemplary embodiment where it is applicable in a gaming environment, and specifically through the example of a war-based game, the disclosure also finds it applications in other gaming environments, and, generally, may be applicable to other graphical user interfaces, not pertaining to a gaming system also. In certain applications, the user interface of the disclosed embodiment can be used for a virtual control of any type of game. Certain aspects of the disclosed embodiments are also applicable to perform other operations, including building arcades and solving puzzle games. Further, the congenial user interface may also be implemented within other types of games, for example, adventurous, role playing and shooting games, construction and management simulation games, and so forth. For example, the congenial user interface can be used in computer terminals employed at financial exchanges, for example in Wall Street in New York and the Stock Exchange in London, where traders need to control multiple transactions simultaneously when executing a financial transaction, for example a synthetic credit default swap or a trading in derivative financial products.

Although the current invention has been described comprehensively, in considerable details to cover the possible aspects and embodiments, those skilled in the art would recognize that other versions of the invention may also be possible.

What is claimed is:

1. A gaming system including a graphical user interface, the gaming system comprising:
   a processor; and
   a computer program product including machine readable instructions that are configured to be executed by the processor to cause the gaming system to render the graphical user interface on a display of the gaming system; wherein the graphical user interface, when rendered on the display, comprises at least one touch sensitive portion, the machine readable instructions when executed by the processor being further configured to cause the processor to:
   render a first graphical element in a first region of the at least one touch sensitive portion, the first graphical element comprising a resource area that includes multiple user selectable resource objects;
   detect a first touching operation at a first location in the first region, the first location corresponding to a resource of multiple user selectable resource objects, the first touching operation causing a selection of the resource;
   detect at least two simultaneous touching operations in at least two different locations in a second region of the at least one touch sensitive portion;
   render at least one instance of the resource corresponding to the first touching operation in the first region at or near the at least two different locations in the second region;
   determine if a time period of the two simultaneous touching operations at the at least two different locations in the second region exceeds a predetermined time period; and
   if the time period of the two simultaneous touching operations in the second region exceeds the predetermined time period, render multiple instances of the resource at or near the at least two different locations in the second region;

wherein a number of the multiple instances of the resource rendered at or near the at least two different locations in the second region is determined by a duration that the time period of the first touching exceeds the predetermined time period.

2. The gaming system according to claim 1, wherein the processor is further configured to:

detect a plurality of sequential touching operations following the detection of the at least two simultaneous operations, the detected plurality of touching operations being detected along a path between the at least two different locations and comprising a swipe movement along the path; and render instances of the resource along the path, wherein a number of instances of the resource rendered along the path is based on a speed of the swipe movement between the at least two different locations.

3. The gaming system according to claim 1, wherein the processor is further configured to:

cause the at least one instance of the resource at or near the at least two different locations in the second region to perform an action associated with the resource on a second graphical element rendered in the second region; and update the rendering of the second graphical element to reflect the performance of the action associated with the resource, wherein the updated rendering of the second graphical element is different than an initial rendering of the second graphical element.

4. The gaming system according to claim 1, wherein the processor is configured to render the at least one instance of the resource at multiple locations along the path, based on a detected touching along the path.

5. The gaming system according to claim 1, wherein the graphical user interface comprises one or more of a desktop computer, a laptop computer, an iPad, or a smart phone, including an iPhone®, an Android® phone or a Symbian® phone.

6. A method of facilitating user interactions with a graphical user interface of a gaming system, the graphical interface being generated and rendered on a display of the gaming system by executing machine readable instructions on a computing hardware of the gaming system, wherein execution of the machine readable instructions on the computing hardware causes the gaming system to:

render a first graphical element in a first region of at least one touch sensitive portion of the graphical user interface, the first graphical element comprising a resource area that includes multiple user selectable resource objects;

detect a first touching operation at a first location in the first region, the first location corresponding to a resource of multiple user selectable resource objects, the first touching operation causing a selection of the resource;

detect at least two simultaneous touching operations at least two different locations in a second region of the at least one touch sensitive portion;

render at least one instance of the resource corresponding to the first touching operation in the first region at or near the at least two different locations in the second region;

determine if a time period of the at least two simultaneous touching operations at the at least two different locations in the second region exceeds a predetermined time period; and if the time period exceeds the predetermined time period, render multiple instances of the resource at or near the at least two different locations in the second region;

wherein a number of the multiple instances of the resource rendered at or near the at least two different locations in the second region is determined by a duration that the time period of the at least two simultaneous touchings exceeds the predetermined time period.

7. The method according to claim 6, wherein execution of the software product on the computing hardware further causes the gaming system to detect a plurality of sequential touching operations after the detection of the at least two simultaneous touching operations, the detected plurality of touching operations being detected along a path between the at least two different locations and comprising a swipe movement along the path; and wherein execution of the software product on the computing hardware further causes the gaming system to render instances of the resource along the path, wherein a number of instances of the resource rendered along the path is based on a speed of the swipe movement between the at least two different locations.

8. The method according to claim 6, wherein execution of the software product on the computing hardware further causes the gaming system to cause the at least one instance of the resource at or near the at least two different locations to perform an action associated with the resource on a second graphical element rendered in the second region; and update the rendering of the second graphical element to reflect the performance of the action associated with the resource, wherein the updated rendering of the second graphical element is different than an initial rendering of the second graphical element.

9. A non-transitory machine readable data storage medium comprising a software product recorded thereon, the software product being executable on computing hardware of a computing device to cause the computing device to:

render a first graphical element in a first region of at least one touch sensitive portion of a graphical user interface of the computing device, the first graphical element comprising a resource area that includes multiple user selectable resource objects;

detect a first touching operation at a first location in the first region, the first location corresponding to a resource of multiple user selectable resource objects, the first touching operation causing a selection of the resource;

detect at least two simultaneous touching operations at least two different locations in a second region of the at least one touch sensitive portion;

render at least one instance of the resource corresponding to the first touching operation in the first region at or near the at least two different locations in the second region;

determine if a time period of the at least two simultaneous touching operations at the at least two different locations in the second region exceeds a predetermined time period; and if the time period exceeds the predetermined time period, render multiple instances of the resource at or near the at least two different locations in the second region;

wherein a number of the multiple instances of the resource rendered at or near the at least two different locations in the second region is determined by a duration that the time period of the at least two simultaneous touchings exceeds the predetermined time period.

10. The non-transitory machine readable data storage medium according to claim 9, wherein execution of the software product on the computing hardware further causes the computing device to detect a plurality of sequential touching operations after the detection of the at least two simultaneous touching operations, the detected plurality of touching operations being detected along a path between the at least two different locations and comprising a swipe movement along the path; and wherein execution of the software product on the computing hardware further causes the gaming system to render instances of the resource along the path, wherein a number of instances of the resource rendered along the path is based on a speed of the swipe movement between the at least two different locations.

11. The non-transitory machine readable data storage medium according to claim 9, wherein execution of the software product on the computing hardware further causes the computing device to cause the at least one instance of the resource at or near the at least two different locations to perform an action associated with the resource on a second graphical element rendered in the second region; and update the rendering of the second graphical element to reflect the performance of the action associated with the resource, wherein the updated rendering of the second graphical element is different than an initial rendering of the second graphical element.

\* \* \* \* \*